(12) United States Patent
Krieger

(10) Patent No.: US 7,156,404 B2
(45) Date of Patent: Jan. 2, 2007

(54) ADJUSTABLE HEIGHT SUSPENSION

(75) Inventor: Daniel J. Krieger, Bismarck, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 358 days.

(21) Appl. No.: 10/882,953

(22) Filed: Jul. 1, 2004

(65) Prior Publication Data

US 2006/0001223 A1   Jan. 5, 2006

(51) Int. Cl.
*B60G 7/02* (2006.01)
(52) U.S. Cl. ............... 280/86.75; 280/124.155; 280/86.753
(58) Field of Classification Search ............ 280/5.504, 280/5.507, 124.134, 124.145, 124.147, 124.15, 280/124.155, 86.75, 86.752, 86.753
See application file for complete search history.

(56) References Cited

U.S. PATENT DOCUMENTS

| 3,197,188 A | | 7/1965 | Moore | |
|---|---|---|---|---|
| 3,679,029 A | | 7/1972 | Thomas | 188/321 |
| 3,994,469 A | * | 11/1976 | Swenson et al. | 248/585 |
| 4,020,929 A | | 5/1977 | Goldin | 188/321 |
| 4,354,770 A | | 10/1982 | Block | 403/409 |
| 5,022,501 A | | 6/1991 | Hayashi et al. | 188/300 |
| 5,624,104 A | | 4/1997 | Hukuda et al. | 267/34 |
| 5,794,911 A | * | 8/1998 | Hill | 248/588 |
| 5,954,400 A | * | 9/1999 | Brodersen | 297/339 |
| 6,112,868 A | * | 9/2000 | Graham et al. | 188/318 |
| 6,129,339 A | * | 10/2000 | Lundgreen et al. | 254/10.5 |
| 6,250,659 B1 | | 6/2001 | Morris | 280/124.147 |
| 6,478,278 B1 | * | 11/2002 | Duncan | 248/407 |
| 6,481,079 B1 | * | 11/2002 | Newhan | 29/401.1 |

* cited by examiner

*Primary Examiner*—Paul N. Dickson
*Assistant Examiner*—Toan C. To
(74) *Attorney, Agent, or Firm*—Westman, Champlin & Kelly, P.A.

(57) ABSTRACT

An apparatus for adjusting a height of suspension of a vehicle frame includes a first end of a shock absorber mounted to a suspension arm and a top end of a shock absorber slidably attached to a frame of the vehicle and is movable in a first plane of travel. An adjusting member is slidably attached to the frame and movable within a second plane of travel non-parallel to the first plane of travel of the second end of the shock absorber. The adjusting member includes a camming surface which provides a force to the second end of the shock absorber such that as the adjusting member moves in the second plane of travel, the camming surface positions the second end of the shock absorber in the first plane of travel thereby adjusting a height of the frame.

18 Claims, 11 Drawing Sheets

ADJUSTABLE HEIGHT SUSPENSION

BACKGROUND OF THE INVENTION

The present invention relates to a suspension for a vehicle. More particularly, the present invention relates to a height adjustable suspension for a vehicle.

Typical vehicle suspensions include shock absorbers or struts which are attached to the frame of the vehicle at an upper end and a suspension arm at a bottom end. A length between the upper end and the lower end of the shock absorber or strut determines the height of the suspension. Although the shock absorber compresses and expands, the shock absorber is generally at a fixed length, or neutral position, corresponding to the weight of the vehicle and the stiffness of the shock absorber. Shock absorber as used herein is intended to mean various suspension elements, such as McPherson struts or other struts.

There are times when the operator of a vehicle may want to raise or lower the suspension thereby positioning the rider farther above or closer to ground level depending on the terrain. Some height adjustment systems include a collar positioned on the outside of the shock absorber. The collar is adjusted and fixedly retained in a selected position to adjust a height of the shock absorber and thereby adjust the height of the suspension. However, the use of a collar changes the length of the shock absorber at the neutral position which also can limit the suspension's travel.

SUMMARY OF THE INVENTION

The present invention includes an apparatus for adjusting a height of a suspension of a vehicle having a first end of a shock absorber mounted to a suspension arm and a second end of the shock absorber slidably attached to a frame. The second end of the shock absorber is movable in a first plane of travel. An adjusting member is slidably attached to the frame and movable in a second plane of travel that is non-parallel to the first plane of travel of the second end of the shock absorber. The adjusting member has a camming surface that provides a force to the second end of the shock absorber such that as the adjusting member moves in the second plane of travel, the camming surface forces the second end of the shock absorber to move in the first plane of travel to adjust the height of the suspension.

DETAILED DESCRIPTION OF THE PREFERRED EMBODIMENTS

Figure 1:
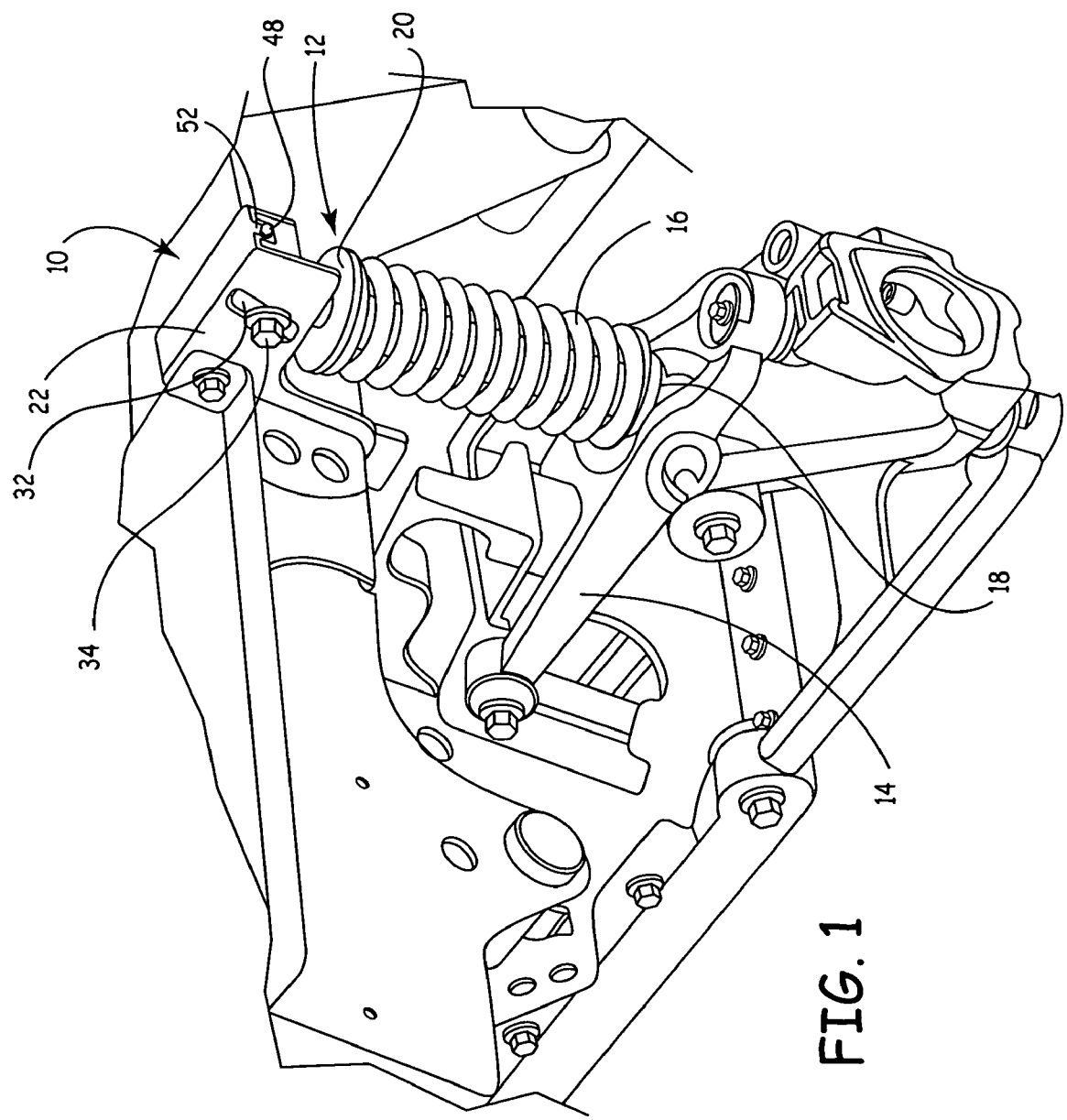
FIG. 1 is a perspective view of a suspension having a suspension adjusting apparatus of the present invention.

An apparatus for adjusting a height of a suspension is generally indicated at 10 in FIG. 1. The suspension 12 includes a bottom end 18 of a shock absorber or strut 16 pivotally mounted to a suspension arm 14, and a top end 20 of a shock absorber 16 mounted to a frame 22. The suspension arm 14 is pivotally attached to the vehicle and is used for mounting a wheel or other ground engaging support.

Figure 2:
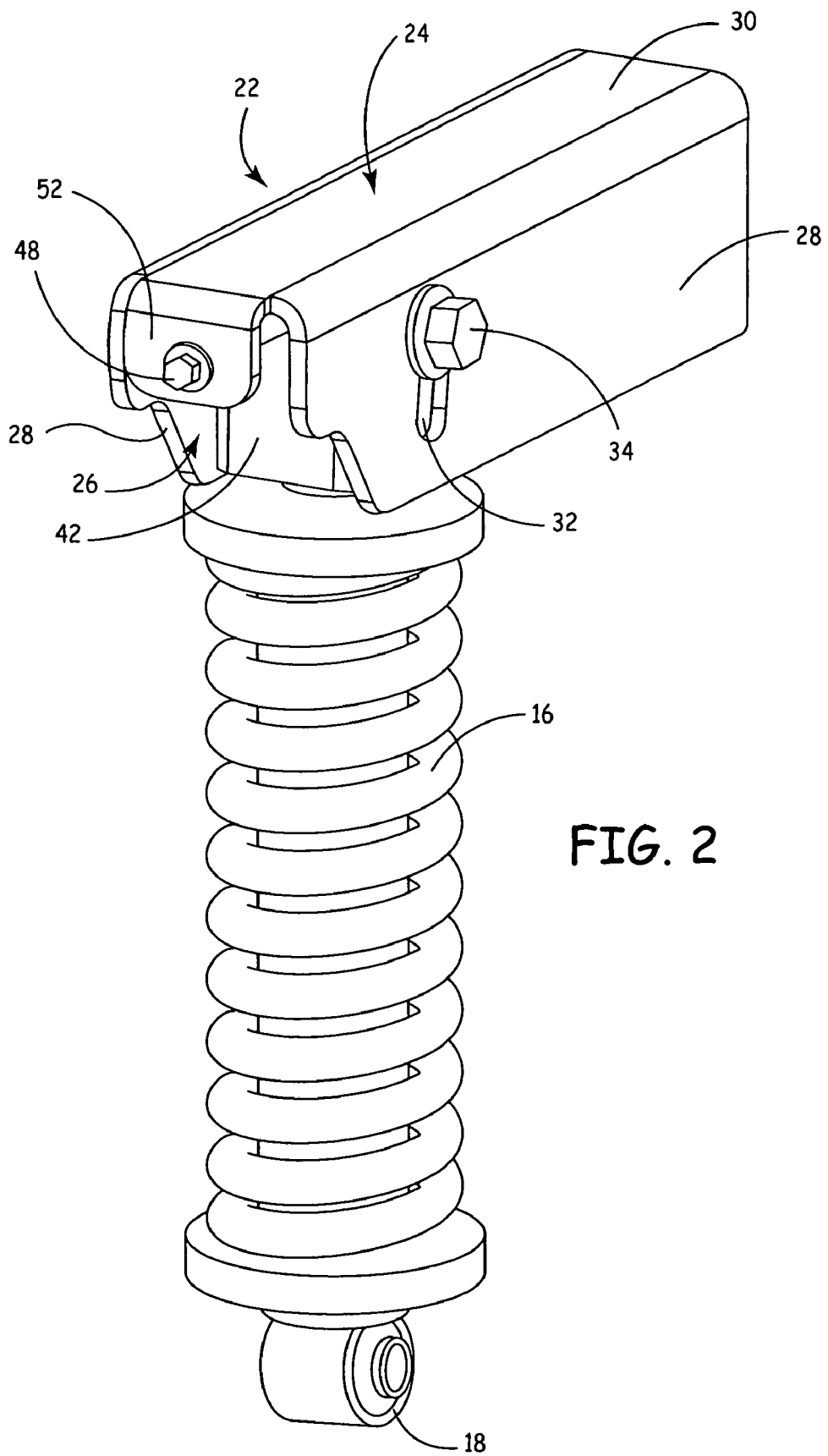
FIG. 2 is a perspective view of a shock absorber having the suspension adjusting mechanism of the present invention attached to a top end.
Figure 3:
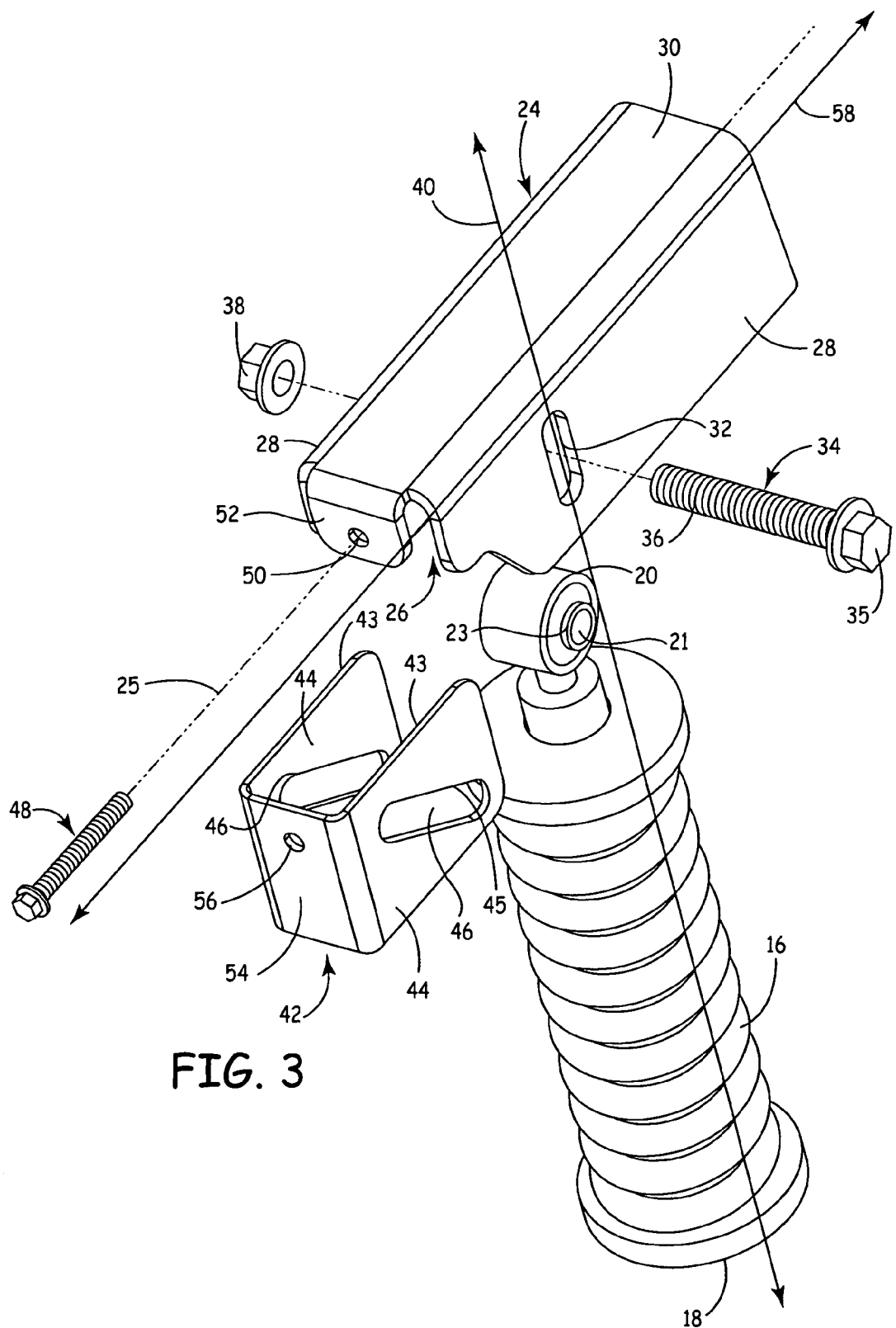
FIG. 3 is an exploded view of the suspension height adjusting mechanism of the present invention.

Referring to FIGS. 2 and 3, the frame 22 includes a U-shaped beam 24 having a channel 26 defined by side walls 28 and a top web 30. The top end 20 of the shock absorber 16 is positioned within the channel 26 and has a central bushing 23 that is slidably retained within the channel 26 by a bolt 34 inserted through aligned generally vertical slots 32 (one of which is shown) in the side walls 28 and a through bore 21 in bushing 23 proximate the top end 20 of the shock absorber 16. The shock absorber 16 is preferably a coil over shock absorber although any design of shock absorber or strut is within the scope of the present invention.

The top end 20 of the shock absorber 16 is secured in a selected position with a nut 38 threadably engaging a threaded distal end 36 of the bolt 34 such that the nut 38 and bolt 34 create a frictional engagement between the side walls 28 of the U-shaped beam 24 and a head 35 of the bolt 34 and the nut 38. The generally vertical slots 32 allow the top end 20 of the shock absorber 16 to travel in a first plane of travel as indicated by arrows 40 substantially perpendicular to the top web 30 of the U-shaped beam 24. Although generally vertical slots are preferred, other configured slots ranging from substantially horizontal to substantially vertical and any angle therebetween are also within the scope of the present invention.

A height adjusting member 42 having a generally U-shaped configuration is positioned within the channel 26 of the U-shaped beam 24. The height adjusting mechanism 42 has generally parallel side walls 44 having aligned slanted slots 46 that intersect the aligned generally vertical slots 32 in the side walls 28 of the U-shaped beam 24. The bushing 23 of the shock absorber top end fits between the side walls 44 of the adjusting member. The bolt 34 is inserted through the aligned slanted slots 46 and the bore 21 as well as the aligned generally vertical slots 32 to retain the height adjusting member 42 within the channel 26.

With the nut 38 loosened from the bolt 34, the height of the suspension 12 is adjusted with a threaded bolt 48 positioned through an aperture 50 in a tab 52 extending substantially vertically from an end of the U-shaped beam 24 where the tab 52 in a generally orthogonal relationship to the channel 26. The threaded bolt 48 threadably engages a threaded aperture 56 in a front web 54 of the height adjusting member 42 such that as the threaded bolt 48 is rotated, the height adjusting member 42 moves in a second plane of travel as indicated by arrows 58 generally along an axis 25 of the channel 28 and generally perpendicular to the first plane 40 of the travel of the top end 20 of the shock absorber 16.

To adjust the height of the suspension 12, the nut 38 is loosened to disengage the frictional engagement between the side walls 28 of the U-shaped beam 24 of the frame 22 from the head 35 of the bolt 34 and the nut 38 and release the clamping force on the ends of bushing 23 such that the bolt 34 freely travels within the aligned generally vertical slots 32 and the slanted slots 46. With the bolt 34 able to travel within the generally vertical slots 32 and the slanted slots 46, the threaded bolt 48 is rotated to move the height adjusting member 42 into a selected position in the second plane of travel 58 such that the aligned slanted slots 46 engage the bolt 34 and forces the top end 26 of the shock absorber 16 to move in the first plane of travel 40.

Figure 4:
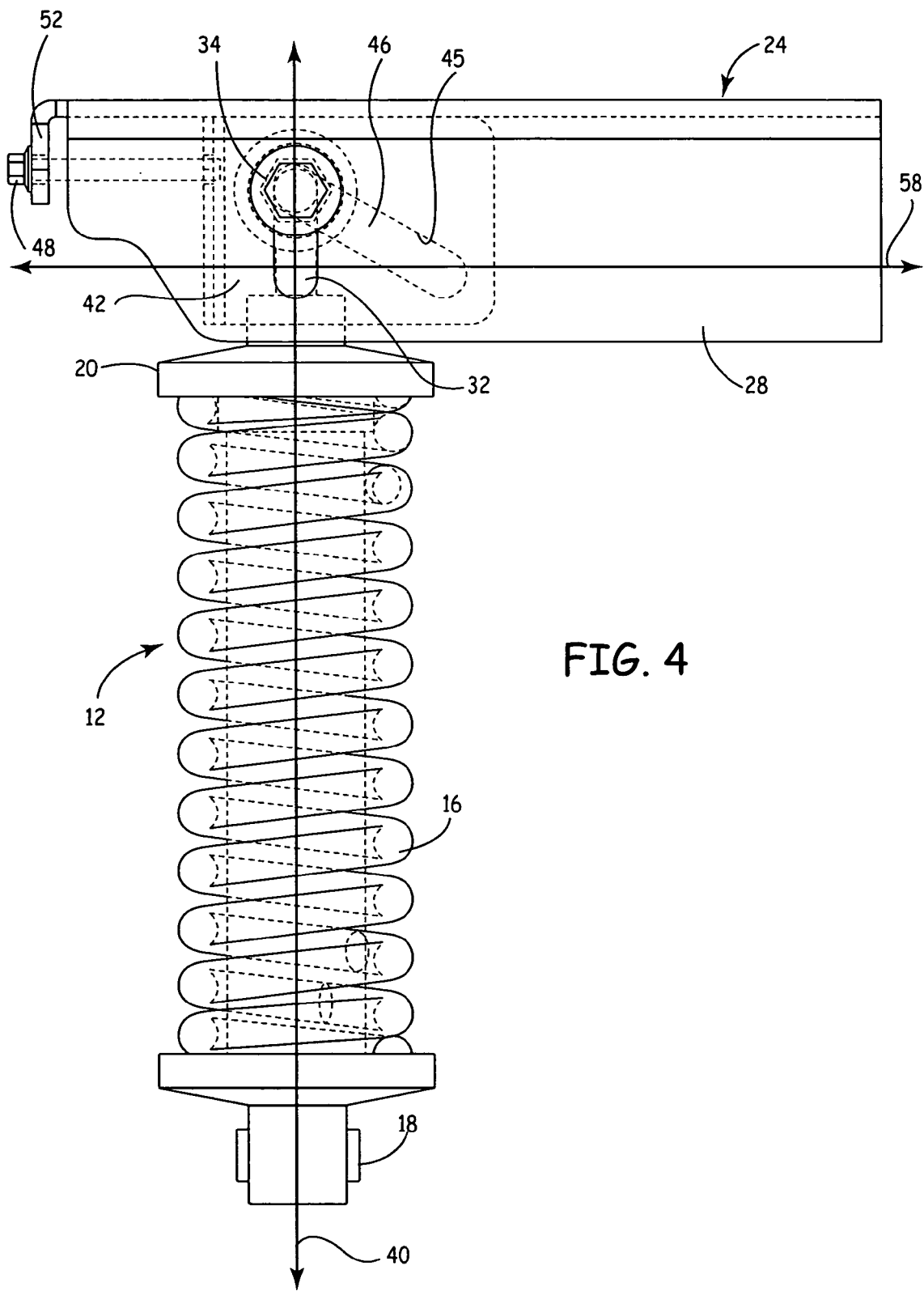
FIG. 4 is a side view of the height adjusting apparatus of the present invention wherein the height of the suspension is minimized.

Referring to FIG. 4, a position of the adjusting member 42 is manipulated by the threaded bolt 48 to minimize a height of the frame 22 and beam 24 relative to the suspension arm 14 and the ground. The distance between the lower end 18 of the shock absorber 16 and the top of the beam 24 is reduced. With the adjusting member 42 in the position to minimize the height of the frame 22, the bolt 34 is positioned proximate top ends of both the substantially vertical slots 40 and the slanted slots 46.

Figure 5:
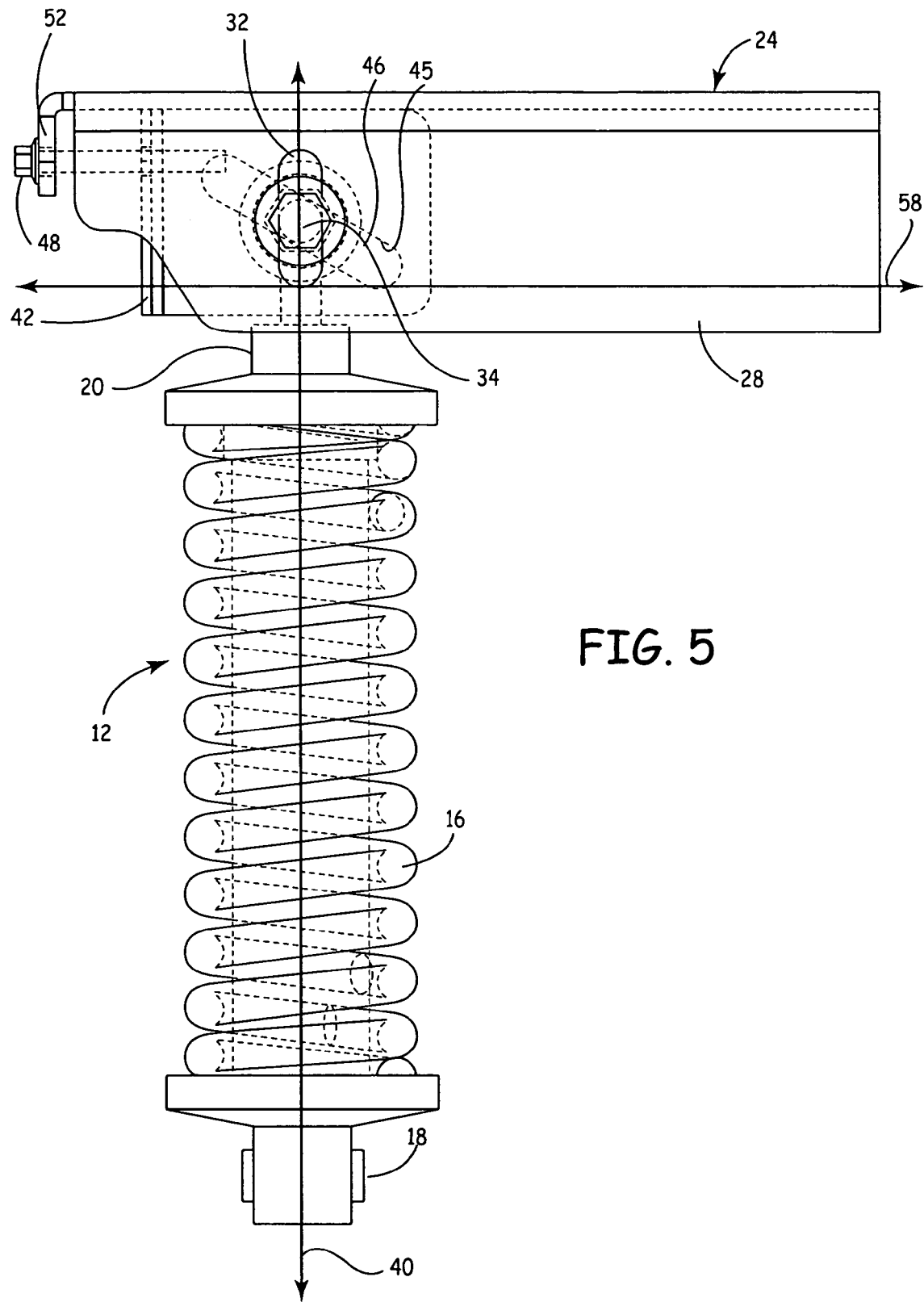
FIG. 5 is a side view of the height adjusting mechanism of the present invention wherein the height of the suspension is at about a mid-point of adjustment.

Referring to FIG. 5, the bolt 48 can be rotated to manipulate the position of the adjusting mechanism 42 along the second plane of travel 58. As the bolt 48 is rotated, the adjusting mechanism 42 is drawn towards the tab 52 in the second plane of travel 58. As the adjusting mechanism 42 moves in the second plane of travel, camming surfaces 45 defining the slanted slots 46 engage the bolt 48 to move in the first plane of travel 40 thereby forcing the frame 22 upwardly and increasing the height of the frame. By adjusting the position of the shock absorber 16 to the center position of FIG. 5, the height of the frame 22 and beam 24 is increased from the showing in FIG. 4.

Figure 6:
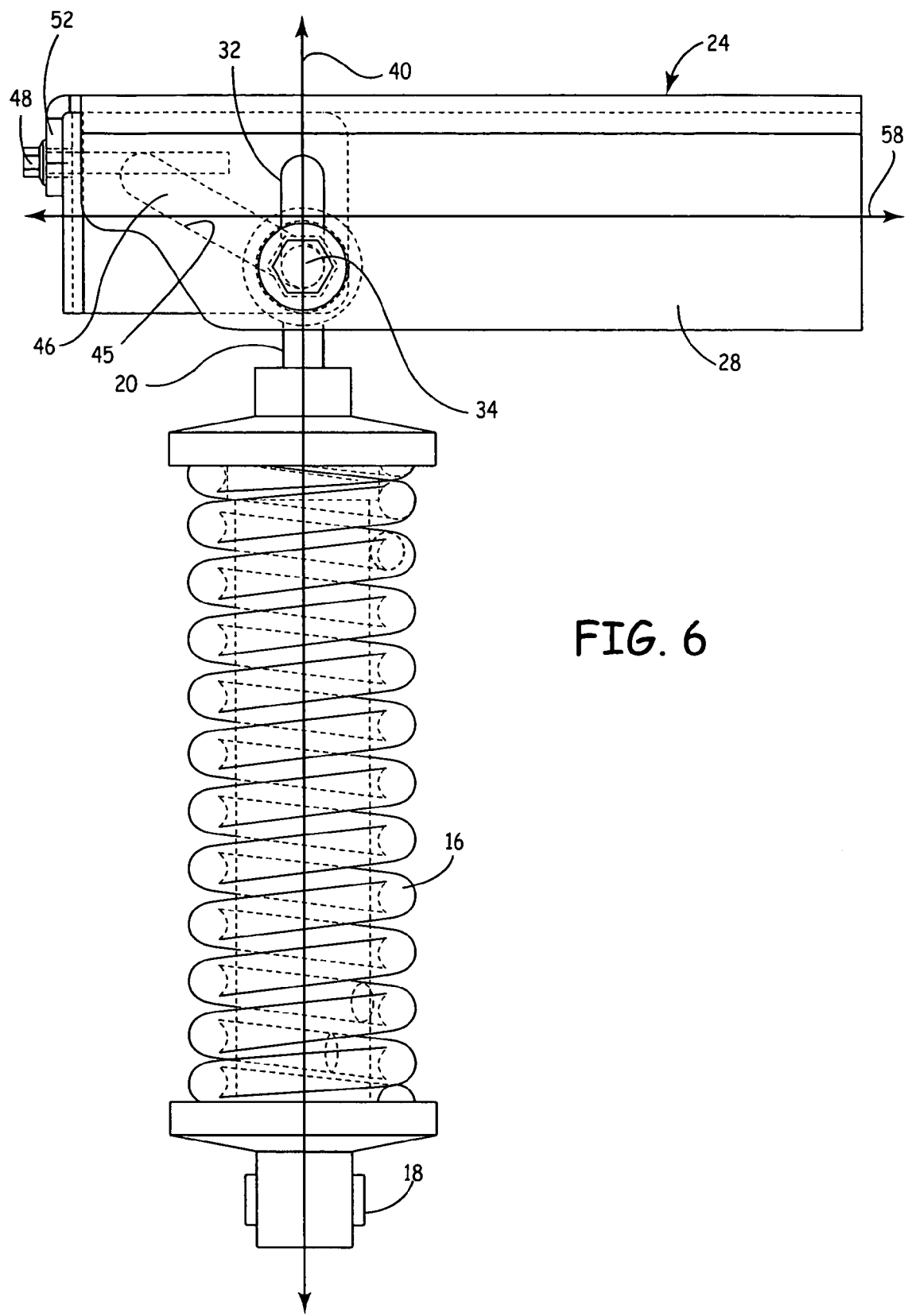
FIG. 6 is a side view of the present invention wherein the height of the suspension is maximized.

Referring to FIG. 6, the height of the frame 22 and beam 24 is maximized by manipulating the bolt 48 such that the adjusting mechanism 42 is drawn in a second plane of travel 58 proximate the tab 52. With the adjusting mechanism 42 proximate the tab, the bolt 34 and bushing 23 are forced by the camming surface 45 to a bottom end of the slanted slots 46 and also to a bottom end of the substantially vertical slots 32. As the adjusting mechanism 42. moves in the second plane of travel 58, the camming surface 45 forces the bolt to move in the first plane of travel 40 and thereby forces the second end 20 of the shock absorber 16 away from the top of the beam 24 and maximizes a height of the frame 22 relative to the arm 14 and the ground 16.

As the rotation of the bolt 48 is reversed, the height of the frame 22 decreases to a minimum as illustrated in FIG. 4 and is positionable in any position between a minimum height as illustrated in FIG. 4 and a maximum height as illustrated in FIG. 6. With the second end 20 of the shock absorber in the selected position, the bolt 48 is maintained in the selected position and the nut 38 is tightened onto the bolt 34 to clamp the side walls 28 and 43 against the ends of the bushing 23 so the position is maintained by frictional forces.

Figure 7:
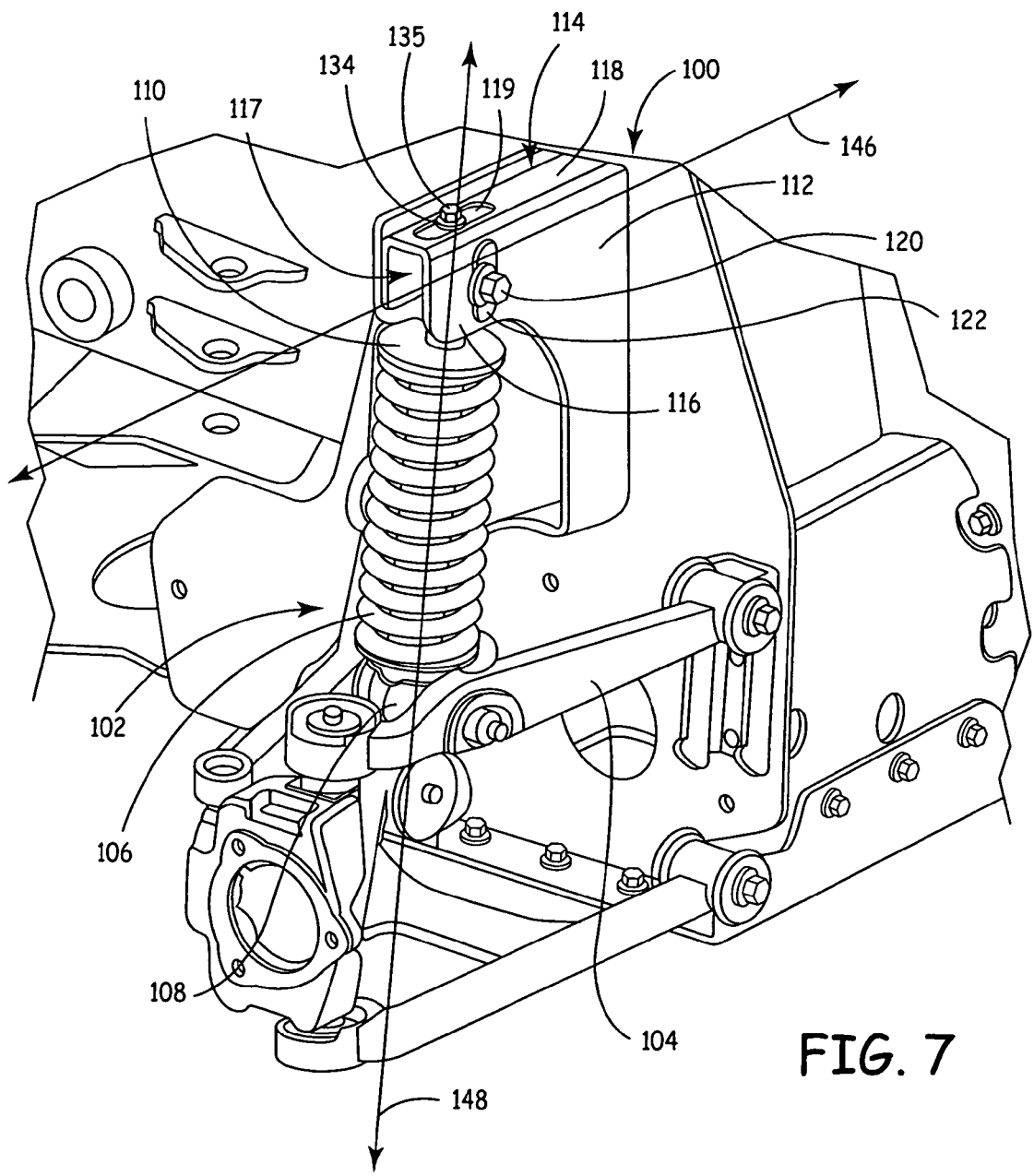
FIG. 7 is a perspective view of an alternative embodiment of the height adjusting mechanism of the present invention.

Another embodiment of an apparatus for adjusting a height of a suspension of the present invention is generally depicted at 100 in FIG. 7. The suspension 102 includes a bottom end 108 of a shock absorber 106 pivotally mounted to a suspension arm 104 and a top end 110 of the shock absorber 106 mounted to a frame 112. The frame 112 includes a U-shaped beam 114 having a channel 117 defined by side walls 116 and a top web 118. The suspension arm 104 carries a wheel or other ground engaging member to support the frame.

Figure 8:
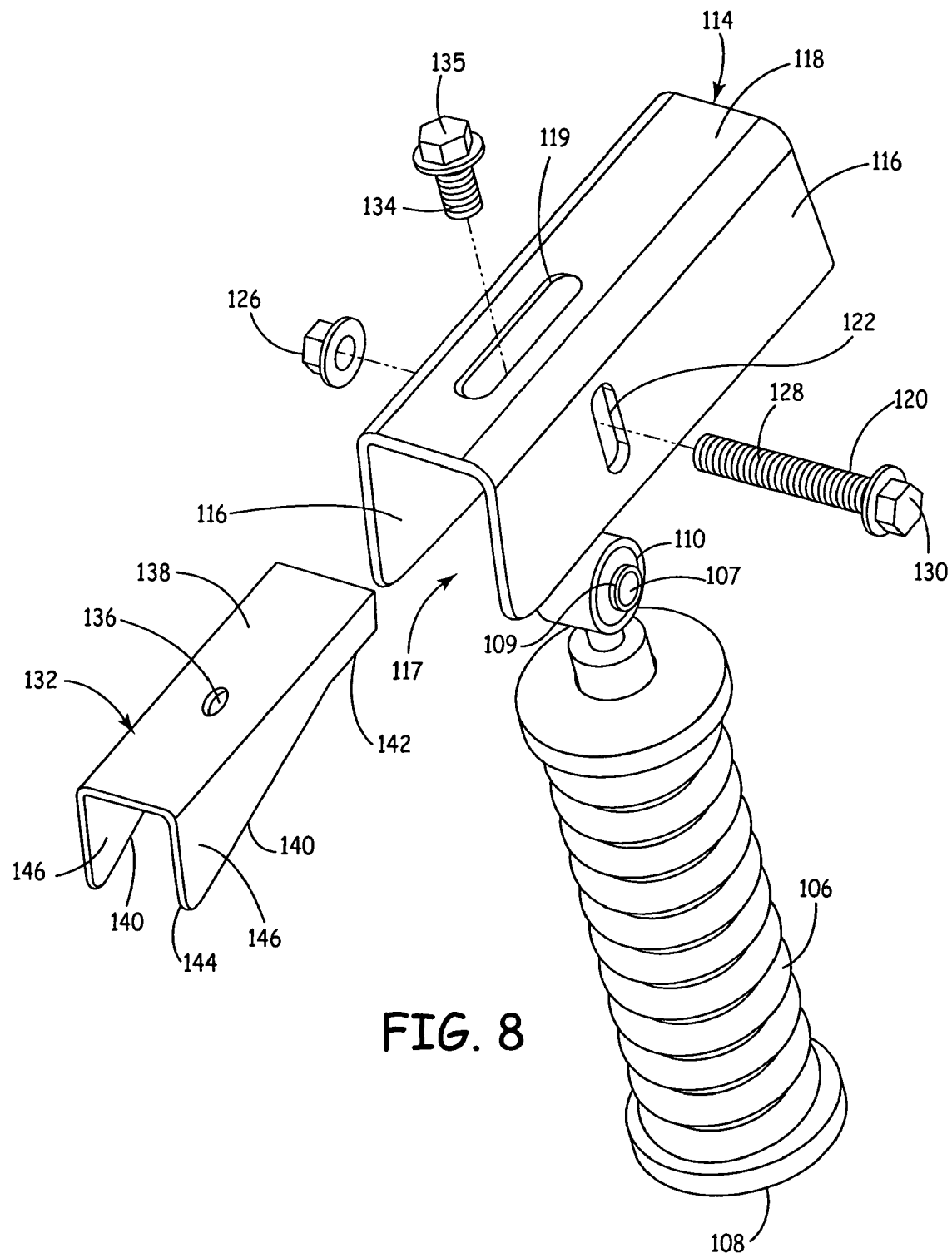
FIG. 8 is an exploded view of the alternative embodiment of the height adjusting mechanism of the present invention.

Referring to FIGS. 7 and 8, the top end 110 of the shock absorber 106 is positioned within the channel 116 and is retained within the channel 116 with a bolt 120 positioned through aligned generally vertical slots 122 (one of which is illustrated) in the side walls 116 of the U-shaped beam 114 and a through bore 107 in a bushing 109 that has ends that extend outwardly from both of the side surfaces of the top end 110 of the shelf absorber. The bushing 109 is mounted in a suitable manner in the top end 110 of the shock absorber 106. The top end 110 of the shock absorber 106 is retained in a selected position within the channel 116 with a nut 126 engaging a threaded portion 128 of the bolt 120 such that a head 130 of the bolt 120 and the nut 126 frictionally engage the side walls 116 of the U-shaped beam 114 and clamp against the ends of bushing 109. Although aligned generally vertical slots 122 are preferred, aligned slots ranging from generally horizontal to generally vertical and any angle there between are also within the scope of the present invention.

A height adjusting member 132 having a generally U-shaped cross-section is positioned within the channel 117 and above the top end 110 of the shock absorber 106. A threaded bolt 134 is inserted through a slot 119 in the top web 118 of the U-shaped beam 114 and engages a threaded bore 136 in a web 138 separating side walls 146 of the height adjusting member 132. The height adjusting member 132 is secured in a selected position within the channel 116 with a frictional engagement of a head 135 of the threaded bolt 134 with the top web 118 of the U-shaped beam 114. The web 138 of the adjusting member 132 is clamped against the underside of web 118 when bolt 134 is tightened.

The height of the suspension 102 that is the height of frame 112 and beam 114 relative to the ground is adjusted with the height adjusting member 132 by loosening the threaded bolt 134 from the top web 118 of the U-shaped beam 114 and moving the height adjusting member 132 within the channel 116. Camming surfaces 140 that define a bottom edge surface of the side walls of height adjusting member 132 engage the outer ends of sleeve or bushing 109 of the top end 110 of the shock absorber 106 to adjust the distance between the bushing 109 of top end 110 and the support surfaces of frame 112. This adjusts a height of the frame 112. What is meant by the camming surface 140 is that a distance of the edge surface 140 from the bottom surface to the web 138 gradually increases from a first end 142 of the height adjusting member 132 to a second end 144 of the height adjusting member 132.

Referring to FIG. 7, the height adjusting member 132 moves generally in a first plane of movement as indicated by arrows 146 such that the camming surfaces 140 engage the ends of the bushing 109 of the top end 110 of the shock absorber 106. As the camming surfaces 140 engage the bushing 109 of the shock absorber 106, the frame 112 moves in a second plane of movement as indicated by arrows 148 substantially perpendicular to the first plane of movement 146 of the height adjusting member 132, although non-perpendicular planes of movement are within the scope of the present invention. The edge surfaces 140 terminate at sections at ends 142 that are perpendicular to the plane of movement 148 to provide a minimum frame height position.

Figure 9:
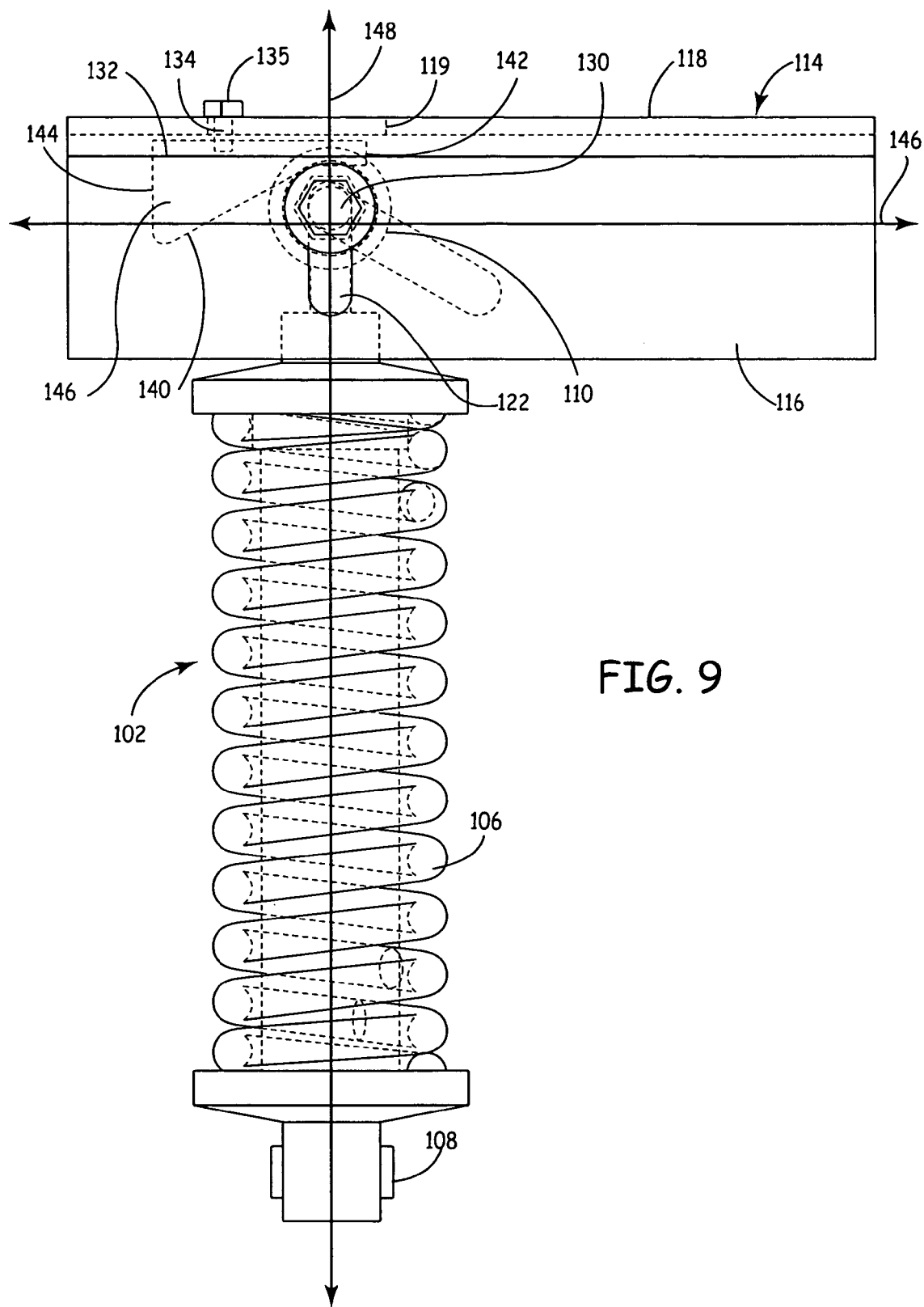
FIG. 9 is a side view of the alternative embodiment of the height adjusting mechanism of the present invention wherein the height of the suspension is minimized.

Referring to FIG. 9, as the first end 142 of the height adjusting member 132 engages the ends of bushing 109 of top end 110 of the shock absorber 106, a distance between the bushing 109 and the web 138 is minimized. The height of the frame 114 above the arm 104 and thus the ground is minimized.

Figure 10:
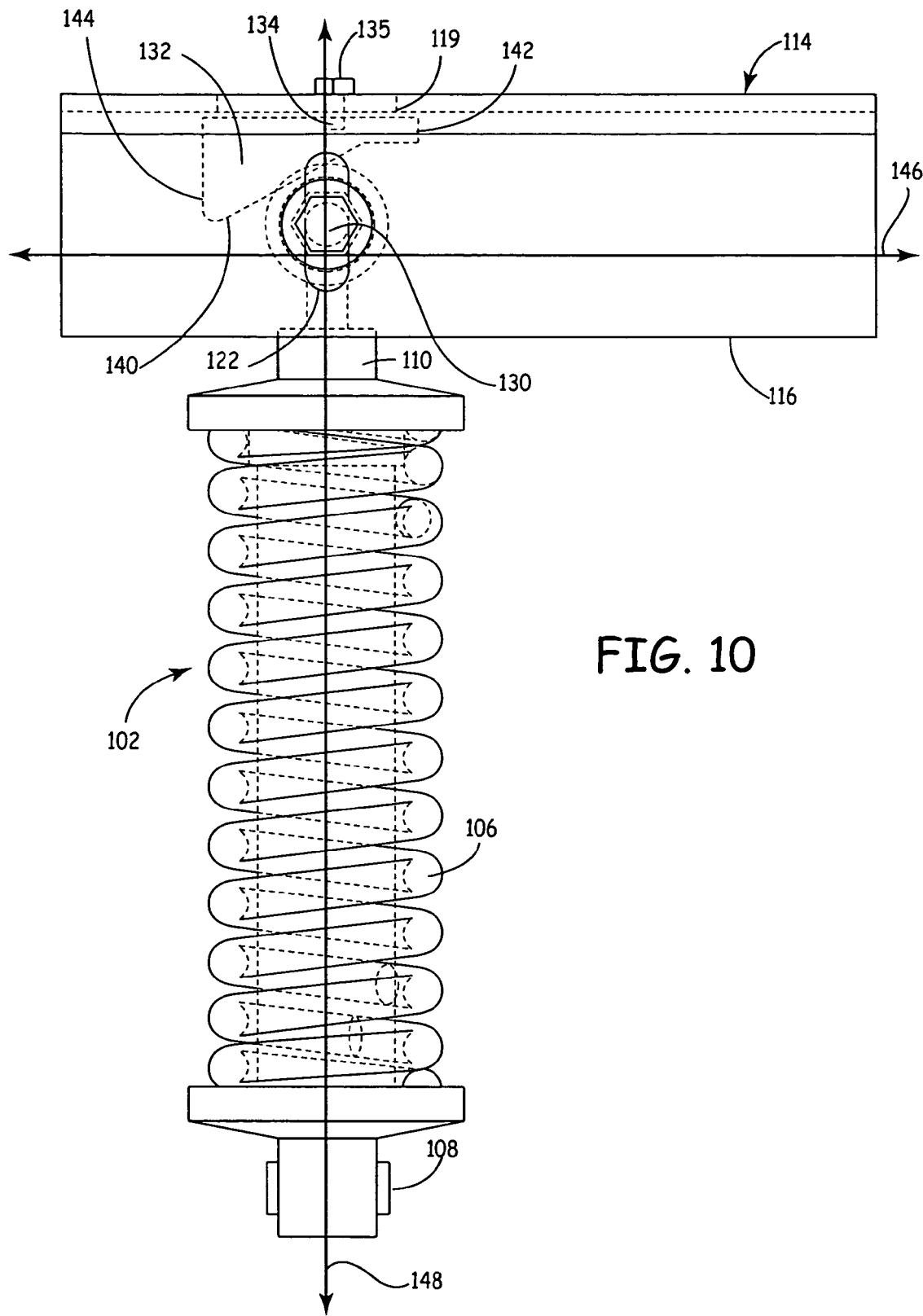
FIG. 10 is a side view of the height adjusting of the alternative embodiment of the height adjusting mechanism of the present invention wherein the height of the suspension is at about a mid-point of adjustment.

Referring to FIG. 10, as the height adjusting member 132 travels in the first plane 146 of travel such that a point of engagement between the bushing 109 of top end 110 of the shock absorber 106 and the bottom camming surface 140 of the height adjusting member 132 moves from the first end 142 towards the second end 144, the bushing 109 of top end 110 of the shock absorber 106 is forced away from the top of beam 114 and thus the beam 114 and frame 112 are raised relative to the ground by the inclined camming surfaces 140. As the camming surface 140 forces the beam up from the top end 110, the height of the suspension 102 is increased.

Figure 11:
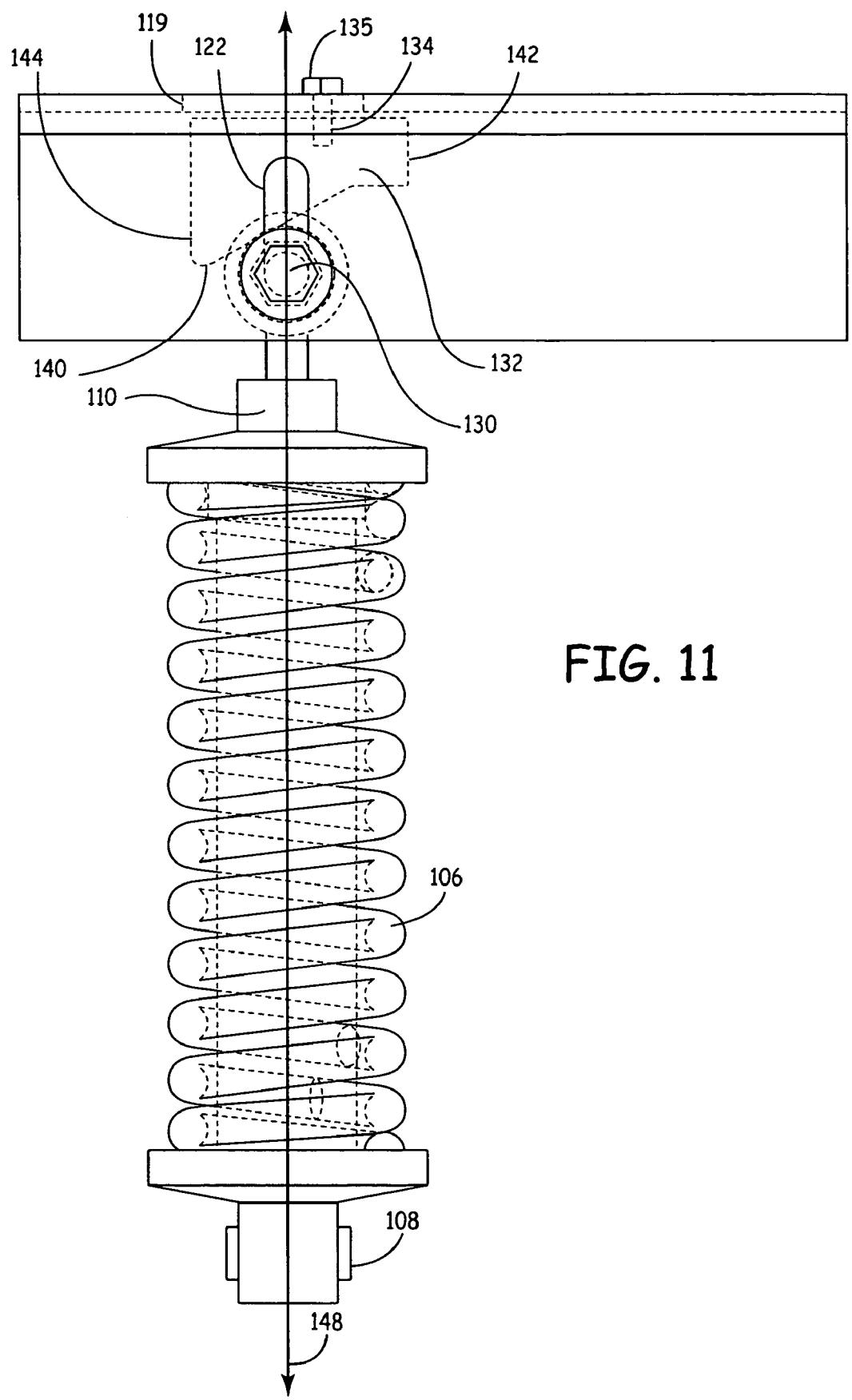
FIG. 11 is a side view of the alternative embodiment of the present invention wherein the height of the suspension is maximized.

Referring to FIG. 11, when the second end 144 of the height adjusting member 132 is engaging the bushing 109 of the top end 110 of the shock absorber 106, a distance between the camming surfaces 140 and the web 138 is maximized. With the distance between the camming surface 140 and the web 138 maximized, the height of beam 114 and frame 112 is maximized. One skilled in the art will appreciate that the height of the suspension 102 can be adjusted to any height corresponding to any position of the height adjusting member 132 between the first end 142 and the second end 144 in relationship to the shock absorber 106 by moving the height adjusting member 132 in the first plane of travel 146.

With the suspension 102 and thus the vehicle frame 112 at a selected height, the threaded bolt 134 is rotated to frictionally secure the height adjusting member 132 to the U-shaped beam 114. With the height adjusting member 132 secured to the U-shaped beam 114, the nut 126 is rotated on the bolt 120 to secure the position of the top end 110 of the shock absorber 108 within the channel 114 by a frictional engagement of the nut 126 and the head 130 of the bolt 120 with the side walls 116 of the U-shaped beam 114 to clamp against the end of the bushing 109.

Although the present invention has been described with reference to preferred embodiments, workers skilled in the art will recognize that changes may be made in form and detail without departing from the spirit and scope of the invention.

What is claimed is:

1. An apparatus for adjusting a height of a suspension of a vehicle having a first end of a shock absorber mounted to a suspension arm, the apparatus comprising:
    a frame attached to the vehicle;
    a second end of the shock absorber slidably attached to the frame and movable in a first plane of travel; and
    an adjusting member slidably attached to the frame and movable in a second plane of travel non-parallel to the first plane of travel of the second end of the shock absorber and having a camming surface controlling the position of the second end of the shock absorber in the first plane of travel such that as the adjusting member is moved in the second plane of travel, the second end of the shock absorber is moved in the first plane of travel and thereby adjusting the height of the suspension.

2. The apparatus of claim 1 and wherein the frame comprises side walls connected to a top web and wherein the sidewalls and the top web define a channel.

3. The apparatus of claim 2 and wherein the frame further comprises a pair of aligned slots within the side walls that intersect the channel.

4. The apparatus of claim 3 and further comprising a bolt positioned through the pair of aligned slots and movable therein and further positioned through the second end of the shock absorber such that as the camming surface moves in the second plane of travel, the camming surface moves the second end of the shock absorber such that the bolt and the second end of the shock absorber travel in the first plane of travel within the aligned slots to adjust the height of the suspension.

5. The apparatus of claim 1 and wherein the camming surface comprises at least one camming slot that forms a non-right angle with the second plane of travel.

6. The apparatus of claim 1 and wherein the camming surface comprises a pair of aligned camming slots that provide the force to the second end of the shock absorber and form a non-right angle with the second plane of travel.

7. The apparatus of claim 1 and further comprising a positioning bolt rotatably engaging the frame and threadably engaging the engaging member and wherein the bolt is substantially aligned with the second plane of travel such that as the bolt is rotated the engaging member moves along the second plane of travel.

8. The apparatus of claim 1 and wherein the camming surface comprises a bottom slanted surface of the adjusting member that forms a non-right angle with the second plane of travel.

9. The apparatus of claim 1 and wherein the camming surface comprises a pair of bottom slanted surfaces that form a non-right angle with the second plane of travel.

10. The apparatus of claim 2 and wherein the top web further comprises a slot substantially aligned with the second plane of travel of the adjusting member.

11. The apparatus of claim 10 and further comprising a bolt positioned through the slot in the frame and threadably engaging an aperture in the adjusting member and wherein the bolt retains the adjusting member in a select position by a frictional engagement with the frame.

12. A method of adjusting a height of a suspension of a vehicle comprising:
    providing a shock absorber having a first end mounted to a suspension arm;
    attaching a second end of the shock absorber to a frame attached to the vehicle wherein the second end of the shock absorber is slidably positionable with respect to the frame in a first plane of travel;
    positioning an adjusting member between the frame and the second end of the shock absorber and wherein the adjusting member comprises a camming surface; and
    moving the adjusting member in a second plane of travel that is non-parallel to the first plane of travel such that the camming surface positions the second end of the shock absorber with respect to the frame, and thereby adjust the height of the suspension.

13. The method of claim 12 and further comprising inserting a bolt through aligned slots in the frame and through an aperture proximate the second end of the shock absorber such that as the adjusting member moves with respect to the frame, the bolt slidably moves within the aligned slots.

14. The method of claim 12 and further comprising retaining the adjusting member to the frame with a bolt inserted through a slot in the frame and threadably engaging the adjusting member to frictionally secure the adjusting member to the frame.

15. The method of claim 12 and further comprising retaining the adjusting member to the frame with a bolt inserted through an aperture located in an end of the frame and threadably engaging the adjusting member such that rotation of the bolt causes the adjusting member to move in the second plane of travel.

16. The method of claim 12 and wherein the camming surface comprises a slot slanted between a horizontal and a vertical position within the adjusting member.

17. The method of claim 12 and wherein the camming surface comprises a bottom surface slanted between a horizontal and a vertical position.

18. An apparatus for adjusting a height of a frame of a vehicle having a first end of a shock absorber mounted to a suspension member movable relative to the frame, the apparatus comprising:
  - a support beam on the frame having a slot extending in a first direction;
  - a second end of the shock absorber being supported on and securable to the support beam with a fastener movable along the slot; and
  - an adjusting cam member slidably mounted relative to the support beam and having a cam surface providing a force to the second end of the shock absorber to position the second end of the shock absorber with the fastener at a selected location along the slot, the fastener releasably securing the second end in the selected position.

* * * * *